No. 803,328. PATENTED OCT. 31, 1905.
F. B. CORE.
ATTACHMENT FOR PHOTOGRAPHIC PRINTING FRAMES.
APPLICATION FILED MAR. 10, 1904.

WITNESSES:
Edward Thorpe.

INVENTOR
Frederick Benjamin Core
BY
ATTORNEYS

UNITED STATES PATENT OFFICE.

FREDERICK BENJAMIN CORE, OF NEW YORK, N. Y.

ATTACHMENT FOR PHOTOGRAPHIC-PRINTING FRAMES.

No. 803,328.     Specification of Letters Patent.     Patented Oct. 31, 1905.

Application filed March 10, 1904. Serial No. 197,415.

*To all whom it may concern:*

Be it known that I, FREDERICK BENJAMIN CORE, a citizen of the United States, and a resident of the city of New York, (borough of Manhattan,) in the county and State of New York, have invented a new and Improved Attachment for Photographic-Printing Frames, of which the following is a full, clear, and exact description.

The invention relates to photography; and its object is to provide a new and improved attachment for photographic-printing frames arranged to insure a uniform printing of a number of photographs from one negative, so that the photographs are practically alike both as to light and shade.

The invention consists of novel features and parts and combinations of the same, as will be more fully described hereinafter and then pointed out in the claims.

A practical embodiment of the invention is represented in the accompanying drawings, forming a part of this specification, in which similar characters of reference indicate corresponding parts in all the views.

Figure 1:
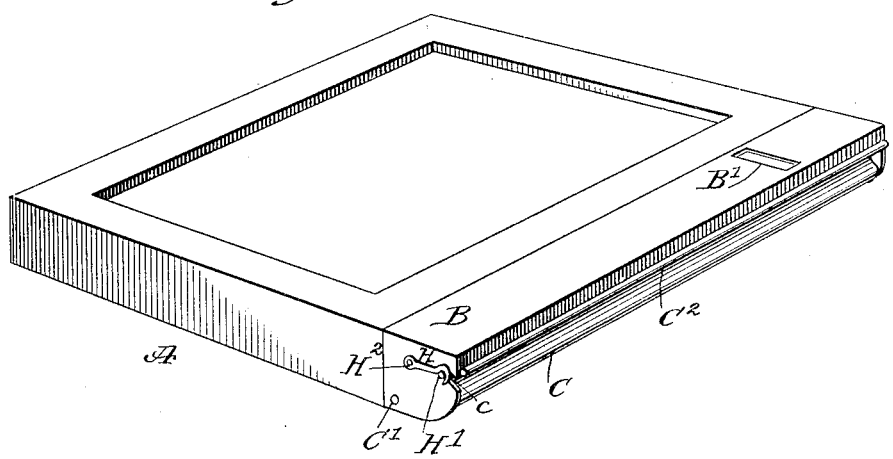
Figure 2:
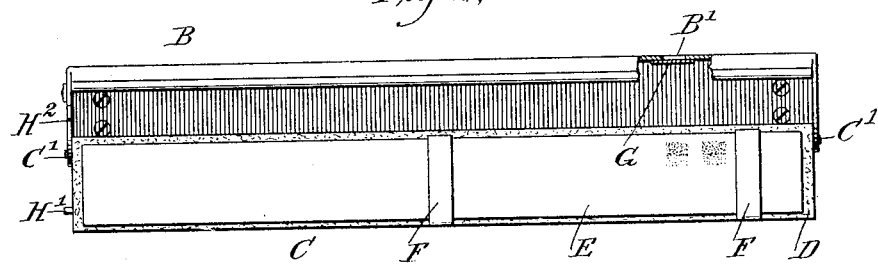
Figure 3:
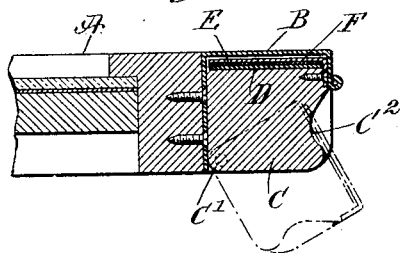
Figure 4:

Figure 1 is a perspective view of the improvement in a closed position on the printing-frame. Fig. 2 is a side elevation of the same in an open position, parts being in section. Fig. 3 is a transverse section of the same, and Fig. 4 is a plan view of the gradation-screen.

The photographic-printing frame A illustrated in the drawings is of any approved construction and is arranged for containing a negative and a sheet of sensitive paper to be exposed to the rays of light for producing a print from the negative in the usual manner.

On one of the sides of the printing-frame A is secured or formed a casing B, open at the bottom and at the lower portion of the front, and in the said casing extends a support C, pivoted at its ends at C' on the ends of the casing B, the pivots being so arranged as to allow of swinging the support downwardly into an open position, as indicated in Fig. 2 and in dotted lines in Fig. 3. The top of the support C is provided with a lining D, of cloth, felt, or other suitable soft material, and on this lining is placed a strip E of sensitive paper, held in position by transverse bars F, secured to or forming part of the support C. When the support C is in a closed position, as illustrated in Figs. 1 and 3, then the sensitive strip E is exposed to the rays of light the same as the sheet of sensitive paper in the frame A, the rays of light passing through an opening B' in the top of the casing B onto a portion of the strip E. The opening B' is preferably closed by a gradation-screen G, of transparent or translucent material, and gradated in such a manner as to allow a graded passage of the rays of light through the screen onto the sensitive strip E.

When the strip E is in position on the support C and the latter is in a closed position in the casing, as shown in Figs. 1 and 3, and a negative and a sheet of sensitive paper are in the frame A and exposed to the rays of light, then during the time the print is made from the negative the rays of light act on the sensitive strip E through the opening B', so as to discolor the portion of the strip E in register with the opening B'. The photographer after making the first print correctly both as to light and shade can now make successive photographs of the same light and shade without requiring frequent opening of the printing-frame A, as heretofore practiced. In order to do this, the operator before placing the second sensitive sheet of paper into the frame for making the second photograph opens the support C and moves the strip E lengthwise under the bars F until a fresh portion of the sensitive face of the strip E is in register with the opening B', and then the support C is closed—that is, swung back into a closed position in the casing B—and then the second sheet of paper is placed in position in the printing-frame A, and the latter is then exposed to light for making the second photograph. During the printing the operator instead of opening the frame A to watch the progress of the printing simply swings the support C from time to time into an open position to compare the newly-discolored portion of the strip E with the previous one until both portions show alike to indicate that the printing of the second sheet has been completed—that is, the second photograph now contains the same light and shade as the first one. The above operation is repeated for all the successive photographs to be printed from the negative in the frame A—that is, for each new photograph to be printed the strip E is shifted lengthwise on the support C, the projecting end of the strip being torn off, if necessary.

It is evident that the operator can always compare the newly-discolored portion of the strip E with the previously-discolored portion to see when the printing is completed to insure uniformity in light and shade of all the photographs made without requiring once opening of the frame A during the printing of the photograph.

By having the gradation-screen G the operator is enabled to make quick comparisons of the successively-discolored portions.

When the strip E is used up, it can be readily replaced by a new one. As a rule, however, the strip E is sufficiently long to allow of printing a dozen photographs before requiring renewal of the strip.

The front side of the support C is preferably provided with a longitudinally-extending recess $C^2$ to form a convenient hand-hole for the operator when swinging the support C into an open or closed position. A suitable locking device H may also be provided for holding the support C in a closed position, and this locking device preferably consists of a pin H', held on one end of the support C and adapted to enter the notch $c$ in an end wall of the casing B and to be engaged by a hook or tongue $H^2$ on the corresponding end of the casing.

It is understood that the casing B and the support C form a holder for the sensitive strip E, the holder allowing only a portion of the strip E to be exposed to the rays of light while the printing of the photograph in the frame A takes place, and the said holder also allows of shifting the strip to bring sensitized non-exposed portions of the strip successively in register with the opening B' for the exposure of the corresponding sensitized portion.

From the foregoing it will be seen that the attachment forms an indicator for indicating the progress of the printing without requiring opening of the frame.

I do not limit myself to the particular construction of the holder shown and described, as the same may be varied without deviating from my invention.

Having thus described my invention, I claim as new and desire to secure by Letters Patent—

1. A photographic-printing frame provided at one side with an attachment, comprising a casing having an opening therein, and a support in the casing for supporting a piece of sensitive paper in the casing below the opening thereof, the casing and support being relatively movable one with respect to the other to permit the insertion of the sensitive paper.

2. A photographic-printing frame provided at one side with an attachment, comprising a casing secured to the said frame and having an opening in its top, and a support movably mounted in the casing for supporting a piece of sensitive paper in the casing below the opening thereof.

3. A photographic-printing frame provided at one side with an attachment, comprising a casing secured to the said frame, said casing being open at the bottom and at the lower front portion and provided with an opening in its top, a support for supporting a piece of sensitive paper below the opening of the casing, said support being pivoted to the casing to swing downwardly into an open position, and means for locking the support in the casing.

4. An attachment for photographic-printing frames, comprising a casing adapted to be secured to one side of the printing-frame, having an exposure-opening, and a support pivoted in the casing and adapted to support a sensitized strip.

5. An attachment for photographic-printing frames, comprising a casing adapted to be secured to one side of the printing-frame, having an exposure-opening, a support pivoted in the casing and adapted to support a sensitized strip, and means for movably holding the said strip in place on the support.

6. An attachment for photographic-printing frames, comprising a casing adapted to be secured to one side of the printing-frame, having an exposure-opening, a support pivoted in the casing and adapted to support a sensitized strip, and a locking device for locking the support in position in the casing.

7. An attachment for photographic-printing frames, comprising an elongated casing open at the bottom and at the lower front portion and provided with an opening in its top, a support pivoted in the casing and adapted to support a strip of sensitive paper below the top of the casing, and means for locking said support in the casing.

8. An attachment for photographic-printing frames, comprising an elongated casing, open at the bottom and at the lower front portion and provided with an opening in its top, one end wall of the casing being provided with a notch, a support pivoted in the casing for supporting a strip of sensitive paper below the top of the casing, said support being provided at one end with a pin adapted to enter the notch of the end wall of the casing, and a hook on the casing engaging the said pin when in said notch.

In testimony whereof I have signed my name to this specification in the presence of two subscribing witnesses.

FREDERICK BENJAMIN CORE.

Witnesses:
   JOHN N. WINECK,
   E. B. CORE.